(12) United States Patent
Dong et al.

(10) Patent No.: US 11,358,438 B2
(45) Date of Patent: Jun. 14, 2022

(54) AUTOMOTIVE AIR CONDITIONING SYSTEM

(71) Applicant: Hangzhou Sanhua Research Institute Co., LTD., Hangzhou (CN)

(72) Inventors: Junqi Dong, Hangzhou (CN); Shiwei Jia, Hangzhou (CN); Jie Liang, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 227 days.

(21) Appl. No.: 16/627,717

(22) PCT Filed: May 17, 2018

(86) PCT No.: PCT/CN2018/087209
§ 371 (c)(1),
(2) Date: Dec. 30, 2019

(87) PCT Pub. No.: WO2019/029218
PCT Pub. Date: Feb. 14, 2019

(65) Prior Publication Data
US 2020/0139788 A1 May 7, 2020

(30) Foreign Application Priority Data

Aug. 8, 2017 (CN) .......................... 201710672529.1
Aug. 8, 2017 (CN) .......................... 201710679735.5

(51) Int. Cl.
*B60H 1/03* (2006.01)
*B60H 1/00* (2006.01)
*B60H 1/32* (2006.01)

(52) U.S. Cl.
CPC ........... *B60H 1/03* (2013.01); *B60H 1/00007* (2013.01); *B60H 1/00278* (2013.01);
(Continued)

(58) Field of Classification Search
CPC .. B60H 1/03; B60H 1/00907; B60H 1/00278; B60H 1/00007; B60H 1/00328;
(Continued)

(56) References Cited

U.S. PATENT DOCUMENTS 5,704,219 A * 1/1998 Suzuki ............... B60H 1/00907
237/2 B
5,878,589 A * 3/1999 Tanaka ............... B60H 1/00007
62/199

(Continued)

FOREIGN PATENT DOCUMENTS

CN 101196316 A 6/2008
CN 101551174 A 10/2009
(Continued)

*Primary Examiner* — Ljiljana V. Ciric
(74) *Attorney, Agent, or Firm* — Cheng-Ju Chiang (57) ABSTRACT

An automotive air conditioning system includes a compressor, a first heat exchanger, a first pump, a first combined valve, a second combined valve, an outdoor heat exchanger, a second heat exchanger and a battery unit. In a first cooling mode, the compressor, the outdoor heat exchanger, the first combined valve and the first heat exchanger communicate in sequence to form a circuit, while the first pump, the first heat exchanger and the second heat exchanger communicate to form another circuit. In a first heating mode, the compressor, the first heat exchanger, the second combined valve and the outdoor heat exchanger communicate in sequence to form a circuit, while the first pump, the first heat exchanger and the second heat exchange communicate in sequence to form another circuit. Thermal management of the battery unit can be made by interacting with the first cooling mode or the first heating mode.

20 Claims, 9 Drawing Sheets

(52) U.S. Cl.
CPC ..... *B60H 1/00328* (2013.01); *B60H 1/00342* (2013.01); *B60H 1/00428* (2013.01); *B60H 1/00899* (2013.01); *B60H 1/00907* (2013.01); *B60H 1/3211* (2013.01); *B60H 1/3213* (2013.01); *B60H 1/3228* (2019.05); *B60H 2001/003* (2013.01); *B60H 2001/00307* (2013.01); *B60H 2001/00942* (2013.01)

(58) Field of Classification Search
CPC ............ B60H 1/00342; B60H 1/00428; B60H 1/00899; B60H 1/3211; B60H 1/3213; B60H 1/3228; B60H 2001/003; B60H 2001/00307; B60H 2001/00942; B60H 1/32284; B60H 2001/00928
See application file for complete search history.

(56) References Cited

U.S. PATENT DOCUMENTS

| | | | | |
|---|---|---|---|---|
| 6,584,796 | B2* | 7/2003 | Itoh | F25B 43/006 |
| | | | | 62/324.1 |
| 7,140,330 | B2 | 11/2006 | Rogers et al. | |
| 9,895,956 | B2* | 2/2018 | Satou | F25B 30/02 |
| 10,052,937 | B2* | 8/2018 | Satou | F25B 40/02 |
| 11,179,999 | B2* | 11/2021 | Mieda | B60H 1/00921 |
| 2004/0074246 | A1* | 4/2004 | Kurata | F25B 43/006 |
| | | | | 62/196.4 |
| 2010/0326127 | A1* | 12/2010 | Oomura | F25B 41/20 |
| | | | | 62/498 |
| 2011/0016896 | A1* | 1/2011 | Oomura | B60H 1/00921 |
| | | | | 62/155 |
| 2011/0048671 | A1* | 3/2011 | Nishikawa | B60H 1/00885 |
| | | | | 165/42 |
| 2012/0060551 | A1* | 3/2012 | Takayama | F25B 29/00 |
| | | | | 62/513 |
| 2012/0222441 | A1 | 9/2012 | Sawada et al. | |
| 2012/0266624 | A1* | 10/2012 | Inaba | F25B 41/20 |
| | | | | 62/324.6 |
| 2013/0299129 | A1 | 11/2013 | Osaka et al. | |
| 2013/0312447 | A1* | 11/2013 | Inaba | F24F 11/30 |
| | | | | 62/324.6 |
| 2013/0319029 | A1* | 12/2013 | Sekiya | B60H 1/00899 |
| | | | | 62/238.7 |
| 2014/0041826 | A1* | 2/2014 | Takeuchi | B60H 1/00899 |
| | | | | 165/10 |
| 2014/0102666 | A1* | 4/2014 | Ichishi | B60H 1/00921 |
| | | | | 165/11.1 |
| 2014/0223943 | A1* | 8/2014 | Ichishi | B60H 1/3205 |
| | | | | 62/215 |
| 2014/0238067 | A1* | 8/2014 | Itou | F25B 30/02 |
| | | | | 62/324.6 |
| 2015/0151609 | A1* | 6/2015 | Satou | F25B 5/02 |
| | | | | 165/63 |
| 2015/0224849 | A1 | 8/2015 | Takeuchi et al. | |
| 2016/0001635 | A1* | 1/2016 | Noda | B60H 1/00007 |
| | | | | 62/160 |
| 2016/0068047 | A1* | 3/2016 | Kobayashi | B60H 1/3228 |
| | | | | 62/401 |
| 2017/0297415 | A1* | 10/2017 | Satou | B60H 1/20 |
| 2018/0222287 | A1* | 8/2018 | Mieda | B60H 1/00914 |
| 2019/0092121 | A1* | 3/2019 | Tan | B60H 1/32281 |
| 2020/0055370 | A1* | 2/2020 | Katayama | B60H 1/32281 |

FOREIGN PATENT DOCUMENTS

| | | |
|---|---|---|
| CN | 101782295 A | 7/2010 |
| CN | 202413720 U | 9/2012 |
| CN | 202747508 U | 2/2013 |
| CN | 103256746 A | 8/2013 |
| CN | 103292510 A | 9/2013 |
| CN | 103358851 A | 10/2013 |
| CN | 103373193 A | 10/2013 |
| CN | 104279800 A | 1/2015 |
| CN | 104422024 A | 3/2015 |
| CN | 105020816 A | 11/2015 |
| CN | 105546873 A | 5/2016 |
| CN | 106274372 A | 1/2017 |
| CN | 205900740 U | 1/2017 |
| CN | 106585323 A | 4/2017 |
| CN | 106608157 A | 5/2017 |
| CN | 106885392 A | 6/2017 |
| CN | 206231187 U | 6/2017 |
| CN | 107791780 A | 3/2018 |
| CN | 107791781 A | 3/2018 |
| EP | 2327575 A1 | 6/2011 |
| JP | 2014-62675 A | 4/2014 |
| WO | 2013/178652 A1 | 12/2013 |

* cited by examiner

AUTOMOTIVE AIR CONDITIONING SYSTEM

CROSS-REFERENCE TO RELATED APPLICATIONS

This patent application is a 35 U.S.C. § 371 National Phase conversion of International (PCT) Patent Application No. PCT/CN2018/087209, titled "Automotive Air Conditioning System", filed on May 17, 2018, and further claims priorities to a Chinese Patent Application No. 201710679735.5, filed on Aug. 8, 2017 with an invention title of "Automotive Air Conditioning System" and a Chinese Patent Application No. 201710672529.1, filed on Aug. 8, 2017 with an invention title of "Automotive Air Conditioning System", the entire contents of which are incorporated herein by reference.

TECHNICAL FIELD

The present application relates to the field of air conditioning, and in particular to an automotive air conditioning system.

BACKGROUND

The automotive air conditioning system is a device that realizes cooling, heating, ventilation and air purification of the air in the compartment. It can provide passengers a comfortable environment, reduce driver fatigue strength, and improve driving safety.

With the rapid development of new energy vehicles, heat pump systems are increasingly used in automotive air conditioning systems. When the heat pump system is used in the automotive air conditioning system, how to optimize the heat pump system to improve system performance is one of the main considerations for system design.

SUMMARY

The present application provides an automotive air conditioning system.

Specifically, the present application is implemented by the following technical solutions:

An automotive air conditioning system includes a compressor, a first heat exchanger, a first combined valve, a second combined valve and an outdoor heat exchanger.

The automotive air conditioning system further includes a first cooling mode and a first heating mode. In the first cooling mode, the compressor, the outdoor heat exchanger, the first combined valve, the second combination valve and the first heat exchanger are communicated in sequence to form a circuit.

In the first heating mode, the compressor, the first heat exchanger, the first combined valve, the second combined valve and the outdoor heat exchanger are communicated in sequence to form a circuit.

It further includes a circulating liquid circuit with a fourth heat exchanger.

It further includes a case in which the first heat exchanger and the fourth heat exchanger are disposed.

Optionally, it further includes a second heat exchanger;

In the first cooling mode, the compressor, the outdoor heat exchanger, the first combined valve and the second heat exchanger are communicated in sequence to form a circuit. The first pump, the second heat exchanger and the first heat exchanger are communicated in sequence to form a circuit.

In the first heating mode, the compressor, the second heat exchanger, the second combination valve and the outdoor heat exchanger are communicated in sequence to form a circuit. The first pump, the second heat exchanger and a first heat exchanger are communicated in sequence to form a circuit.

Optionally, it further includes a first expansion reservoir in communication with the first pump.

Optionally, the first combination valve includes a first expansion valve and a first check valve connected in parallel.

The second combined valve includes a second expansion valve and a second check valve connected in parallel.

In the first heating mode, a refrigerant flows in order through the first heat exchanger, the first check valve, the second expansion valve and the outdoor heat exchanger. In the first cooling mode, the refrigerant flows in order through the outdoor heat exchanger, the second check valve, the first expansion valve and the first heat exchanger.

Optionally, it further includes a battery unit, a third expansion device, a third heat exchanger and a second pump. The third heat exchanger is a liquid heat exchanger. The automotive air conditioning system further includes a second cooling mode in which the compressor, the outdoor heat exchanger, the expansion valve and the third heat exchanger are communicated in sequence to form a circuit, and the third heat exchanger, the second pump and the battery unit are communicated in sequence to form a circuit.

Optionally, it further includes a heater.

The automotive air conditioning system further includes a second heating mode in which the third heat exchanger, the second pump, the heater and the battery unit are communicated in sequence to form a circuit.

Optionally, the automotive air conditioning system further includes a dehumidification mode in which the compressor, the second heat exchanger, the expansion valve and the third heat exchanger are communicated in sequence to form a circuit, and the third heat exchanger, the second pump and the fourth heat exchanger are communicated in sequence to form a circuit.

Optionally, it further includes a three-way valve. A first outlet of the three-way valve is communicated with the battery unit, a second outlet of the three-way valve is communicated with the third heat exchanger, and a third outlet of the three-way valve is communicated with the fourth heat exchanger.

Optionally, it further includes a baffle plate which is disposed between the first heat exchanger and the fourth heat exchanger.

Optionally, it further includes a second expansion reservoir in communication with the second pump.

It can be seen from the above technical solutions that the first heat exchanger participates in both cooling and heating, which can reduce the volume of the system, thereby reducing the amount of refrigerant charge. In addition, the cooling and heating share the same circulating liquid circuit formed by the first pump, the first heat exchanger and the second heat exchanger communicated in sequence, which further reduces the volume of the system and the amount of refrigerant charge. Furthermore, the first heat exchanger is selected as a liquid heat exchanger, and the refrigerant circuit is separated from the circulating liquid circuit, which can minimize the amount of refrigerant entering the second heat exchanger and improve safety of the system.

It should be understood that the above general description and the following detailed description are merely exemplary and explanatory, and should not limit the present application.

BRIEF DESCRIPTION OF DRAWINGS

The drawings herein are incorporated in and constitute a part of the description, illustrate embodiments consistent with the present application, and serve to explain the principles of the present application together with the description.

1: compressor; 2: first heat exchanger; 3: first pump; 4: first combined valve; 4a: first expansion valve; 4b: first check valve; 5: second combined valve; 5a: second expansion valve; 5b: second check valve; 6: outdoor heat exchanger; 7a: first shut-off valve; 7b: second shut-off valve; 7c: third shut-off valve; 7d: fourth shut-off valve; 8: first expansion reservoir; 9: gas-liquid separator;

10: battery unit; 11: expansion valve; 12: third heat exchanger; 13: second pump; 14: heater; 15: second expansion reservoir; 16: three-way valve;

100: air conditioning case; 101: second heat exchanger; 102: fourth heat exchanger; 103: fan; 104: baffle plate.

DETAILED DESCRIPTION

The technical solutions in the embodiments of the present application will be clearly and completely described below with reference to the drawings in the embodiments of the present application. Obviously, the described embodiments are only a part of the embodiments of the present application, but not all of the embodiments. Based on the embodiments in the present application, all other embodiments obtained by a person of ordinary skill in the art without creative efforts shall fall within the protection scope of the present application.

Exemplary embodiments will be described in detail here, examples of which are illustrated in the drawings. When the following description refers to the drawings, same numerals in different drawings represent the same or similar elements unless otherwise indicated. The exemplary embodiments described as follows do not represent all embodiments consistent with the present application. Rather, they are merely examples of devices and methods consistent with some aspects of the invention as detailed in the claims.

The terminology used in the present application is for the purpose of describing particular embodiments and is not intended to limit the present application. The singular forms "a", "the" and "said" as used in the description and the claims are also intended to include the majority, unless the context clearly indicates otherwise. It should also be understood that the term "and/or" as used herein refers to and includes any or all possible combinations of one or more of the associated listed items.

It should be understood that although the terms first, second, third, etc. may be used in the present application to describe various kinds of information, the information should not be limited to these terms. These terms are only used to distinguish the same type of information from each other. For example, without departing from the scope of the present application, the first information may also be referred to as the second information, and similarly, the second information may also be referred to as the first information. Depending on the context, the word "if" as used herein can be interpreted as "under certain condition" or "when" or "in response to determination".

The automotive air conditioning system of the present application will be described in detail below with reference to the drawings. In the case of no conflict, the features of the following embodiments and implementations can be combined with each other.

Figure 1:
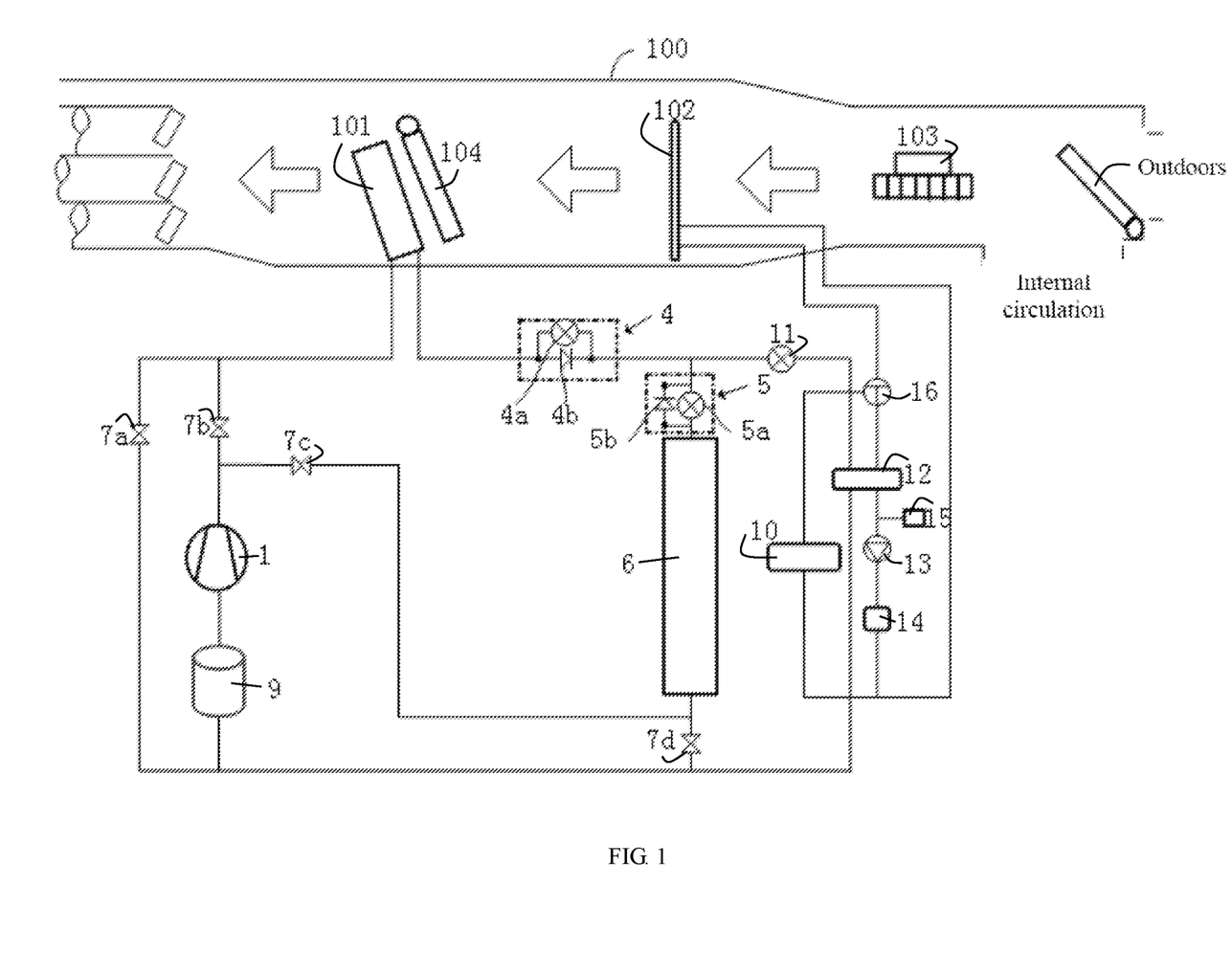
FIG. 1 is a schematic structural diagram of an automotive air conditioning system according to an embodiment of the present application.

Referring to FIG. 1, an embodiment of the present application provides an automotive air conditioning system, which may include a compressor 1, a first heat exchanger 101, a first expansion device 4, a second expansion device 5 and an outdoor heat exchanger 6. In this embodiment, the first heat exchanger 101 and the outdoor heat exchanger 6 are both air-cooled heat exchangers. The automotive air conditioning system further includes a first cooling mode which can achieve cooling of the compartment and a first heating mode which can achieve heating of the compartment. At the same time, the automotive air conditioning system can only work in one of the first cooling mode and the first heating mode.

Figure 2:
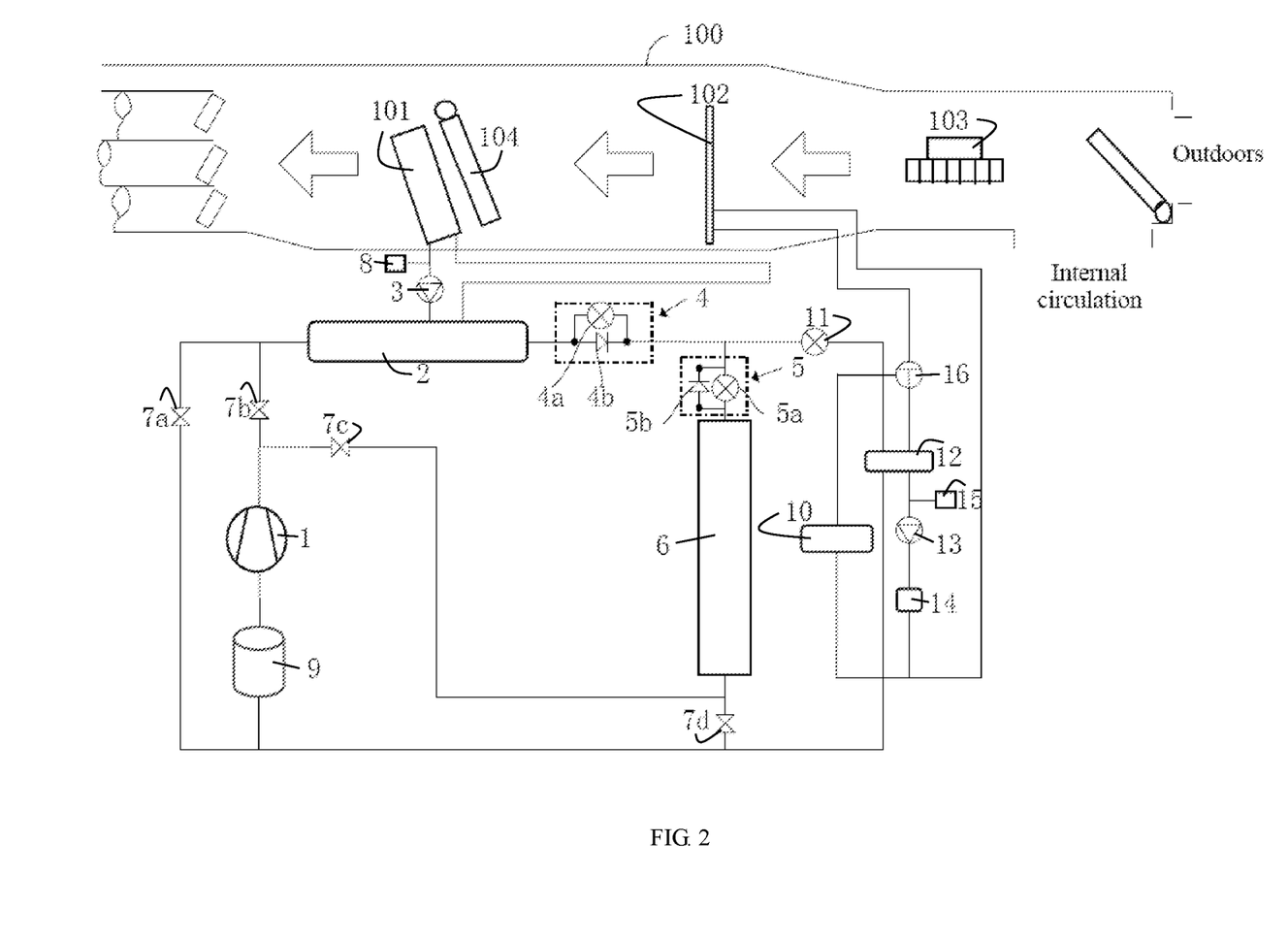
FIG. 2 is a schematic structural diagram of an automotive air conditioning system according to another embodiment of the present application.

Referring to FIG. 2, an automotive air conditioning system according to an embodiment of the present application may include a compressor 1, a first heat exchanger 2, a first pump 3, a first combined valve 4, a second combined valve 5, an outdoor heater 6 and first heat exchanger 101. In this embodiment, the second heat exchanger 2 is a water-cooled heat exchanger, and the first heat exchanger 101 and the outdoor heat exchanger 6 are both air-cooled heat exchangers. The automotive air conditioning system further includes a first cooling mode which can achieve cooling of the compartment and a first heating mode which can achieve heating of the compartment. At the same time, the automotive air conditioning system can only work in one of the first cooling mode and the first heating mode.

Figure 3:
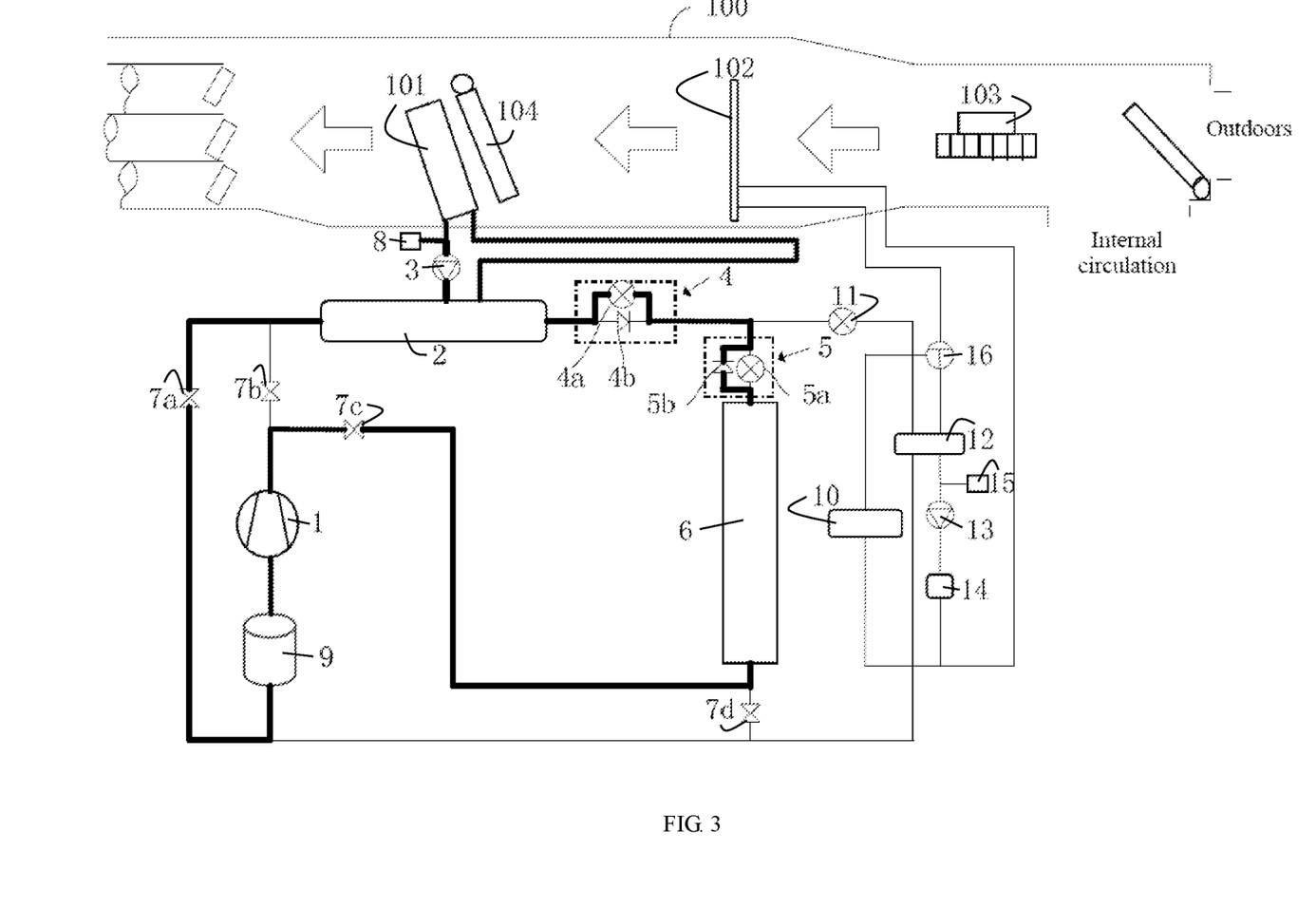
FIG. 3 is a schematic diagram of a refrigerant flow path and a circulating liquid flow path of the automotive air conditioning system of FIG. 2 in a first cooling mode, wherein the bold portion indicates the flow path.
Figure 4:
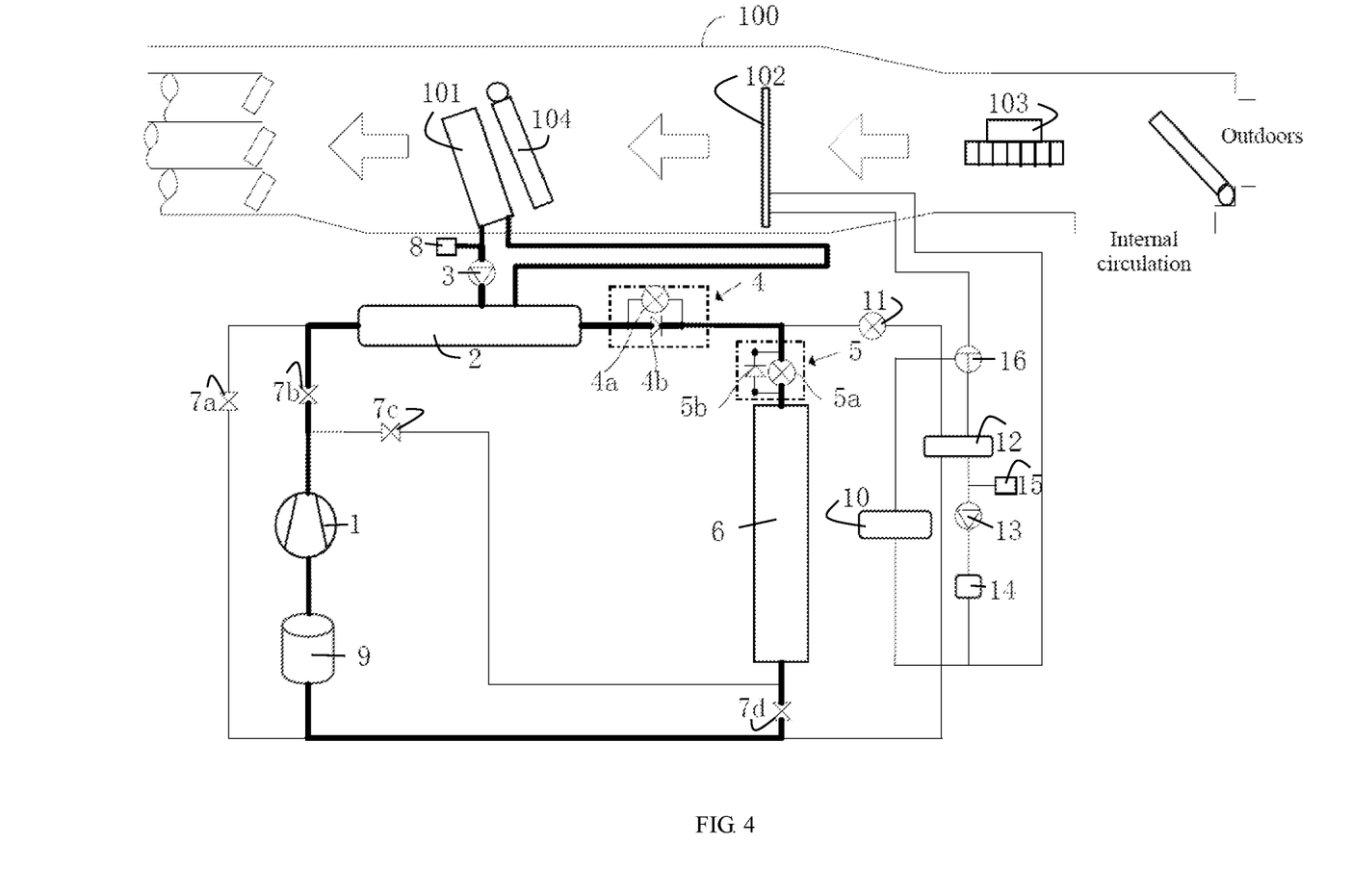
FIG. 4 is a schematic diagram of a refrigerant flow path and a circulating liquid flow path of the automotive air conditioning system of FIG. 4 in a first heating mode, where the bold portion indicates the flow path.

Referring to FIG. 3, in the first cooling mode, the compressor 1, the outdoor heat exchanger 6, the first combination valve 4 and the second heat exchanger 2 are sequentially communicated to form a circuit. The first pump 3, the second heat exchanger 2 and the first heat exchanger 101 are sequentially communicated to form a circuit. Referring to FIG. 4, in the first heating mode, the compressor 1, the second heat exchanger 2, the second combination valve 5, and the outdoor heat exchanger 6 are sequentially communicated to form a circuit. The first pump 3, the second heat exchanger 2 and the first heat exchanger 101 are sequentially communicated to form a circuit. Among them, the circuit formed and communicated in sequence by the compressor 1, the outdoor heat exchanger 6, the first combination valve 4 and the second heat exchanger 2, and the circuit formed and communicated in sequence by the compressor 1, the second heat exchanger 2, the second combination valve 5 and the outdoor heat exchanger 6 are both refrigerant circuits. The circuit formed and communicated in sequence by the first pump 3, the second heat exchanger 2 and the first heat exchanger 101 is circulating fluid circuit. It should be noted that, in the embodiments of the present application, the description of "communicated in sequence" only describes the sequence relationship of the connections among various components, and other devices, such as a shut-off valve, can be communicated between the various components. In addition, the type of the circulating fluid of the present application may be selected according to needs. For example, the circulating fluid may be a substance capable of exchanging heat such as water or oil, or a mixed solution of water and ethylene glycol, or another mixed solution capable of performing heat exchange.

Specifically, in the first cooling mode, the second heat exchanger 2 is used as an evaporator, and the outdoor heat exchanger 6 is used as a condenser. Referring to FIG. 3, when the gaseous refrigerant enters the outdoor heat exchanger 6, the high-temperature and high-pressure refrigerant exchanges heat with the outdoor air flow in the outdoor heat exchanger 6, the refrigerant releases heat, and the released heat is carried to the ambient air by the air flow. In the meanwhile, the refrigerant undergoes a phase change and condenses into a liquid refrigerant or a gas-liquid two-phase refrigerant. The refrigerant flows out of the outdoor heat exchanger 6 and enters the first combined valve 4 to expand, and decreases the temperature and pressure into a low-temperature and low-pressure refrigerant. The low-temperature and low-pressure refrigerant enters the second heat exchanger 2 and exchanges heat with the circulating fluid in the second heat exchanger 2 to absorb the heat of the circulating fluid. The low-temperature circulating fluid enters the first heat exchanger 101 and the low-temperature circulating fluid absorbs the heat of the air around the first heat exchanger 101, which reduces the temperature of the air around the first heat exchanger 101. Under the action of the air flow, the cold air enters the grill air duct (not shown in FIG. 3) and is then sent into the compartment to reduce the compartment temperature and provide a comfortable environment. The refrigerant undergoes a phase change. Most of the refrigerant evaporates into a low-temperature and low-pressure gaseous refrigerant, which flows back into the compressor 1 to realize the recycling of the refrigerant.

In the first heating mode, the second heat exchanger 2 is used as a condenser or air cooler, and the outdoor heat exchanger 6 is used as an evaporator. Referring to FIG. 4, the compressor 1 compresses a low-temperature and low-pressure gaseous refrigerant into a high-temperature and high-pressure gaseous refrigerant. The high-temperature and high-pressure gaseous refrigerant enters the second heat exchanger 2 and exchanges heat with the circulating liquid in the second heat exchanger 2. The refrigerant releases heat, and the circulating fluid in the second heat exchanger 2 becomes a high-temperature circulating fluid. The high-temperature circulating fluid enters the first heat exchanger 101 and the air around the first heat exchanger 101 for heat exchange. The heat is released into the air to increase the temperature of the air around the first heat exchanger 101. Under the action of the air flow, the hot air enters the grille duct (not shown in FIG. 4) and is then sent into the compartment to increase the compartment temperature and provide a comfortable environment. The cooled refrigerant flows to the second combination valve 5 and decreases the temperature and pressure into a low-temperature and low-pressure refrigerant. The low-temperature and low-pressure refrigerant enters the outdoor heat exchanger 6, absorbs the heat in the external air flow, and then returns to the compressor 1 to realize the recycling of the refrigerant.

In the embodiment of the present application, the second heat exchanger 2 participates in both cooling and heating, which can reduce the volume of the system, thereby reducing the amount of refrigerant charge. In addition, the cooling and heating share the same circulating fluid circuit formed and communicated in sequence by the first pump 3, the second heat exchanger 2 and the first heat exchanger 101, which further reduces the volume of the system and the amount of refrigerant charge. In addition, the second heat exchanger 2 is selected as a liquid heat exchanger, and the refrigerant circuit is separated from the circulating liquid circuit, which can minimize the amount of refrigerant entering the first heat exchanger 101 and improve safety of the system.

In this embodiment, the second heat exchanger 2 may be selected as a plate heat exchanger or other liquid heat exchanger. The outdoor heat exchanger 6 and the first heat exchanger 101 may select the type of an air-cooled heat exchanger according to requirements, which is not limited in the embodiment of the present application.

In addition, the inlet of the compressor 1 may be provided with a gas-liquid separator 9 to separate the refluxing refrigerant, and the liquid portion thereof is stored in the gas-liquid separator 9 while the low-temperature and low-pressure gaseous refrigerant portion is recompressed in to the compressor 1 for realizing the recycling of the refrigerant. Of course, for some new compressors 1, the gas-liquid separator 9 may not be required.

In the following, the structure of the automotive air conditioning system will be further described by using a gas-liquid separator 9 at the inlet of the compressor 1.

The first combination valve 4 and the second combination valve 5 can play a role of reducing temperature and pressure in the air conditioning system, and generally include a throttle valve, a common thermal expansion valve or an electronic expansion valve. Referring again to FIG. 2, in this embodiment, the first combined valve 4 and the second combined valve 5 are communicated in series between the second heat exchanger 2 and the outdoor heat exchanger 6. The first combined valve 4 is communicated with the second heat exchanger 2, and the first combined valve 4 may include a first expansion valve 4a and a first check valve 4b connected in parallel. The second combined valve 5 is communicated with the outdoor heat exchanger 6, and the second combined valve 5 may include a second expansion valve 5a and a second check valve 5b connected in parallel.

In this embodiment, the second heat exchanger 2, the first combined valve 4, the second combined valve 5 and the outdoor heat exchanger 6 are sequentially communicated. In the first cooling mode, the second check valve 5b and the first expansion valve 4a are opened, and the second expansion valve 5a and the first check valve 4b are closed. In the first heating mode, the first check valve 4b and the second expansion valve 5a are opened, and the first expansion valve 4a and the second check valve 5b are closed. In this embodiment, the first combined valve 4 and the second combined valve 5 are provided to optimize the refrigerant circuit and reduce the laying amount of pipes in the air conditioning system. It should be noted that in the embodiments of the present application, in each mode, only one of the first expansion valve 4a and the first check valve 4b is opened, and the other is closed. Correspondingly, in each mode, one of the second expansion valve 5a and the second check valve 5b is opened, and the other is closed.

Further, referring to FIG. 2, the automotive air conditioning system may include a first shut-off valve 7a, a second shut-off valve 7b, a third shut-off valve 7c and a fourth shut-off valve 7d. The outlet of the compressor 1 includes two branches, one branch is communicated with the second heat exchanger 2 rather than the first combination valve 4 via the second shut-off valve 7b, and the other branch is communicated with the outdoor heat exchanger 6 rather than the second combination valve 5 via the third shut-off valve 7c. The inlet of the compressor 1 is divided into two branches after the gas-liquid separator 9, one branch is communicated with the second heat exchanger 2 rather than the first combination valve 4 via the first shut-off valve 7a, and the other branch is communicated with the outdoor heat exchanger 6 rather than the second combined valve 5 via the fourth shut-off valve 7d. Among them, the third shut-off valve 7c is connected in parallel with the second shut-off valve 7b and the fourth shut-off valve 7d. By opening and closing the first shut-off valve 7a, the second shut-off valve 7b, the third shut-off valve 7c and the fourth shut-off valve 7d, the branches are opened and closed, thereby realizing switching of different modes. Each of the aforementioned shut-off valves may be a manual shut-off valve, or an electric or pneumatic shut-off valve.

Referring to FIG. 3, in the first cooling mode, the third shut-off valve 7c, the second check valve 5b, the first expansion valve 4a, and the first shut-off valve 7a are opened, and the second shut-off valve 7b, the fourth shut-off valve 7d, the second expansion valve 5a and the first check valve 4b are closed. The flow path of the refrigerant circuit includes: the compressor 1→the third shut-off valve 7c→the outdoor heat exchanger 6→the second check valve 5b→the first expansion valve 4a→the second heat exchanger 2→the first shut-off valve 7a→the gas-liquid separator 9→the compressor 1. The flow path of the circulating liquid circuit includes: the first pump 3→the second heat exchanger 2→the first heat exchanger 101→the first pump 3.

In the first heating mode, the second shut-off valve 7b, the first check valve 4b, the second expansion valve 5a and the fourth shut-off valve 7d are opened, and the first shut-off valve 7a, the third shut-off valve 7c, the first expansion valve 4a and the second check valve 5b are closed. The flow path of the refrigerant circuit includes: the compressor 1→the second shut-off valve 7b→the second heat exchanger 2→the first check valve 4b→the second expansion valve 5a→the outdoor heat exchanger 6→the fourth shut-off valve 7d→the gas-liquid separator 9→the compressor 1. The flow path of the circulating liquid circuit includes: the first pump 3→the second heat exchanger 2→the first heat exchanger 101→the first pump 3.

Referring again to FIG. 2, the automotive air conditioning system may further include a first expansion reservoir 8 communicated with the first pump 3. The first expansion reservoir 8 is used as a liquid supply for the circulating liquid circuit in the first cooling mode and the first heating mode. The first expansion reservoir 8 can be used to accommodate and compensate the amount of expansion and contraction of the circulating fluid in the circulating fluid circuit.

The automotive air conditioning system further includes a battery unit 10 for supplying power to the electrical equipment of the automobile. Referring again to FIG. 1, the automotive air conditioning system may further include an expansion valve 11, a third heat exchanger 12 and a second pump 13. In this embodiment, the third heat exchanger 12 is a liquid heat exchanger. The automotive air conditioning system may further include a second cooling mode, which can achieve cooling of the battery unit 10 and prevent the temperature of the battery unit 10 from becoming too high.

Figure 5:
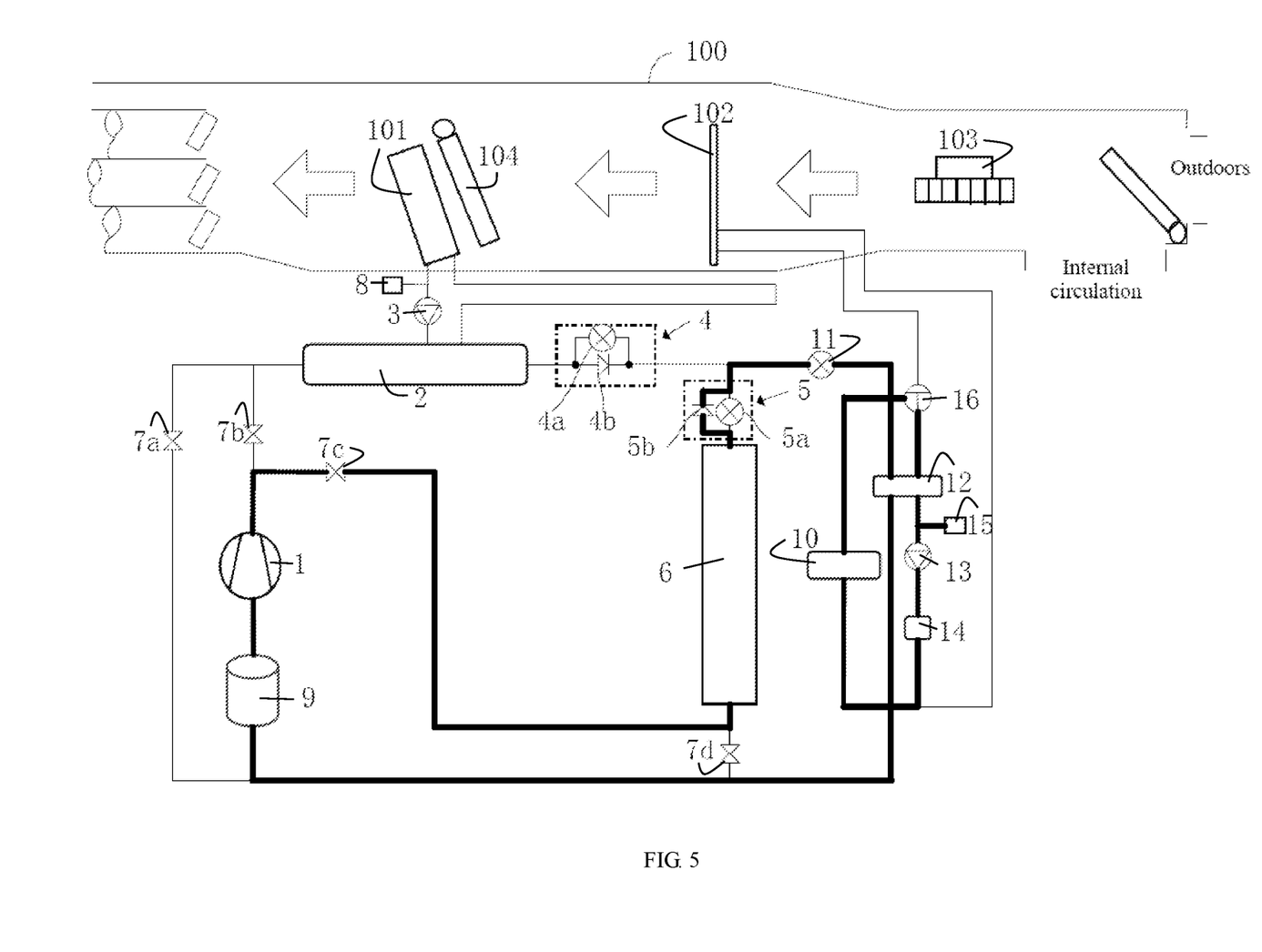
FIG. 5 is a schematic diagram of a refrigerant flow path and a circulating liquid flow path of the automotive air conditioning system of FIG. 2 in a second cooling mode, where the bold portion indicates the flow path.

Referring to FIG. 5, in the second cooling mode, the compressor 1, the outdoor heat exchanger 6, the expansion valve 11 and the third heat exchanger 12 are communicated in sequence to form a circle. The third heat exchanger 12, the second pump 13 and the battery unit 10 are communicated in sequence to form a circle. Among them, the compressor 1, the outdoor heat exchanger 6, the expansion valve 11 and the third heat exchanger 12 are communicated in sequence to form a refrigerant circuit. The third heat exchanger 12, the second pump 13 and the battery unit 10 are communicated in sequence to form a circulating fluid circuit. In this embodiment, a port of the second combination valve 5 is both communicated with the first combination valve 4 and the expansion valve 11.

The expansion valve 11 can also reduce the temperature and pressure in an air conditioning system. Generally, the expansion valve 11 can be a throttle valve, a common thermal expansion valve or an electronic expansion valve. In this embodiment, the expansion valve 11 includes an electronic expansion valve.

In the second cooling mode, the third shut-off valve 7c, the second check valve 5b and the expansion valve 11 are opened, and the second expansion valve 5a is closed. The flow path of the refrigerant circuit includes: the compressor 1→the third shut-off valve 7c→the outdoor heat exchanger 6→the second check valve 5b→the expansion valve 11→the third heat exchanger 12→the gas-liquid separator 9→the compressor 1. The flow path of the circulating liquid circuit includes: the second pump 13→the battery unit 10→the third heat exchanger 12→the second pump 13.

In the second cooling mode, the third heat exchanger 12 is used as an evaporator, and the outdoor heat exchanger 6 is used as a condenser. Referring to FIG. 5, the compressor 1 compresses a low-temperature and low-pressure gas refrigerant into a high-temperature and high-pressure gas refrigerant. The high-temperature and high-pressure gas refrigerant enters the outdoor heat exchanger 6 and exchanges heat with the outdoor air flow in the outdoor heat exchanger 6. The refrigerant releases heat, and the released heat is carried to the ambient air by the air flow. In the meanwhile, the refrigerant undergoes a phase change and condenses into a liquid refrigerant or a gas-liquid two-phase refrigerant. The refrigerant flows out of the outdoor heat exchanger 6 and enters the expansion valve 11 to expand, and decreases the temperature and pressure into a low-temperature and low-pressure refrigerant. The low-temperature and low-pressure refrigerant enters the third heat exchanger 12 and exchanges heat with the circulating liquid in the third heat exchanger 12 to absorb the heat of the circulating liquid. The absorbed circulating liquid enters the battery unit 10 and then takes away the heat of the battery unit 10. The circulating liquid flows into the third heat exchanger 12 again, and thus circulates. The refrigerant undergoes a phase change and most of the refrigerant evaporates into a low-temperature and low-pressure gaseous refrigerant, which flows back into the compressor 1 to realize the recycling of the refrigerant.

Figure 6:
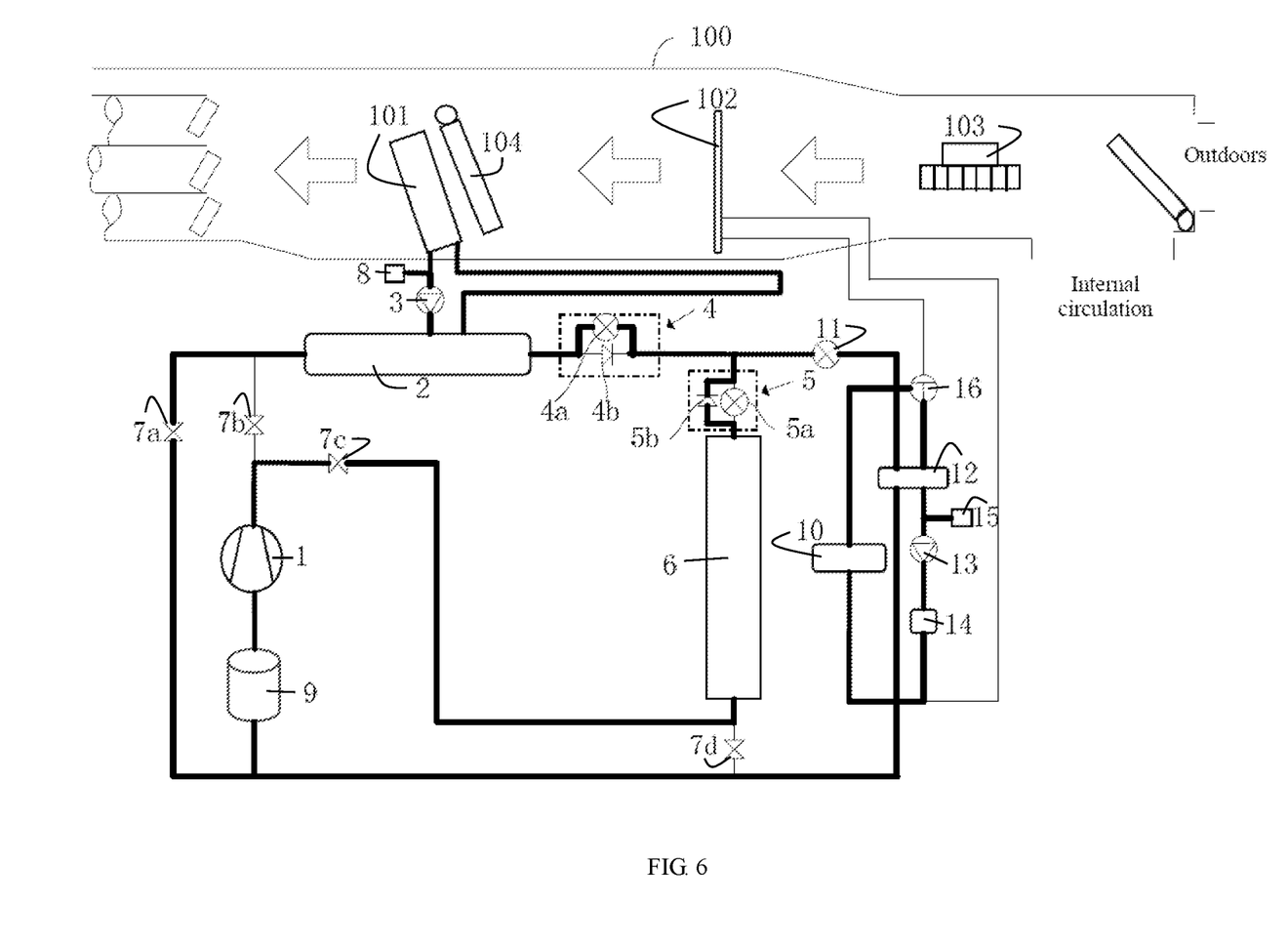
FIG. 6 is a schematic diagram of a refrigerant flow path and a circulating liquid flow path of the automotive air conditioning system of FIG. 2 in a first cooling mode and a second cooling mode, wherein the bold portion indicates the flow path.

Referring to FIG. 6, in the embodiment of the present application, the first cooling mode and the second cooling mode can be performed at the same time, so that both the compartment cooling and the battery unit 10 cooling can be achieved in the same time period, where the automobile is in a very hot environment.

Referring to FIG. 2 again, the automotive air conditioning system may further include a heater 14. By providing the heater 14, the battery unit 10 is heated to prevent the temperature thereof from being too low and reducing energy efficiency. In this embodiment, the heater 14 is an electric heater, such as a PTC heater. It should be noted that in the second cooling mode, the heater 14 only plays a role of flowing the circulating liquid (similar to the role of a pipe).

The automotive air conditioning system may further include a second heating mode which is also known as a battery heating mode. In the second heating mode, the third heat exchanger 12, the second pump 13, the heater 14 and the battery unit 10 are sequentially communicated to form a circuit. Among them, the circuit formed and sequentially communicated by the third heat exchanger 12, the second pump 13, the heater 14 and the battery unit 10 is a circulating liquid circuit. Referring to FIG. 6, the automotive air conditioning system further includes a cabin heating and battery unit cooling mode in which the cabin can be heated and the battery unit 10 can be cooled down. When the automotive air conditioning system works in the cabin heating and battery unit cooling mode, the compressor 1, the first heat exchanger 101, the second expansion device 5 and the outdoor heat exchanger 6 are communicated in sequence to form a refrigerant circuit; the compressor 1, the first heat exchanger 101, the third expansion device 11 and the third heat exchanger 12 are communicated in sequence to form another refrigerant circuit; and the second pump 13, the battery unit 10 and the third heat exchanger 12 are communicated to form a circulating fluid circuit. A refrigerant flows through the refrigerant circuit and the another refrigerant circuit, and a circulating liquid flows through the circulating liquid circuit. The circulating liquid is adapted to absorb the heat of the battery unit 10, and the refrigerant is adapted to absorb the heat of the circulating liquid via the third heat exchanger 12.

Figure 7:
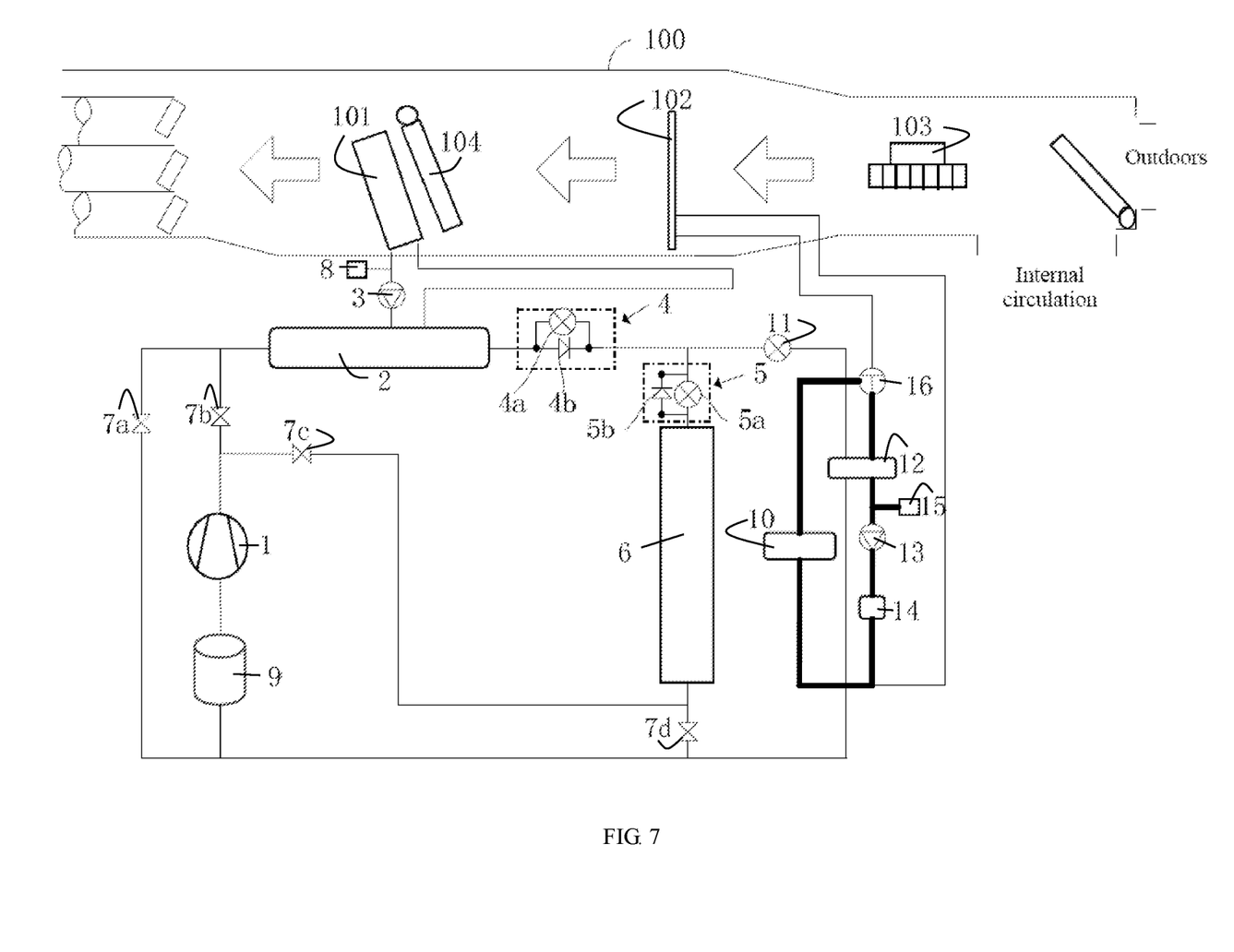
FIG. 7 is a schematic diagram of a circulating fluid flow path of the automotive air conditioning system of FIG. 2 in a second heating mode, wherein the bold portion indicates the flow path.

Referring to FIG. 7, in the second heating mode, the flow path of the circulating liquid circuit includes: the second pump 13→the heater 14→the battery unit 10→the third heat exchanger 12→the second pump 13. Specifically, in the second heating mode, the third heat exchanger 12 only plays the role of flowing the circulating fluid. The circulating fluid in the second pump 13 enters the heater 14 for heating, the heater 14 outputs the circulating fluid with high temperature to the battery unit 10 and to heat the battery unit 10, and the circulating liquid flows into the third heat exchanger 12 again, and thus circulates.

Referring again to FIG. 2, the automotive air conditioning system may further include a second expansion reservoir 15 communicated with the second pump 13. The second expansion reservoir 15 is used as a liquid supply for a circulating liquid circuit in the second cooling mode and the second heating mode. And, the second expansion reservoir 15 can be used to accommodate and compensate the amount of expansion and contraction of the circulating fluid in the circulating fluid circuit.

Figure 8:
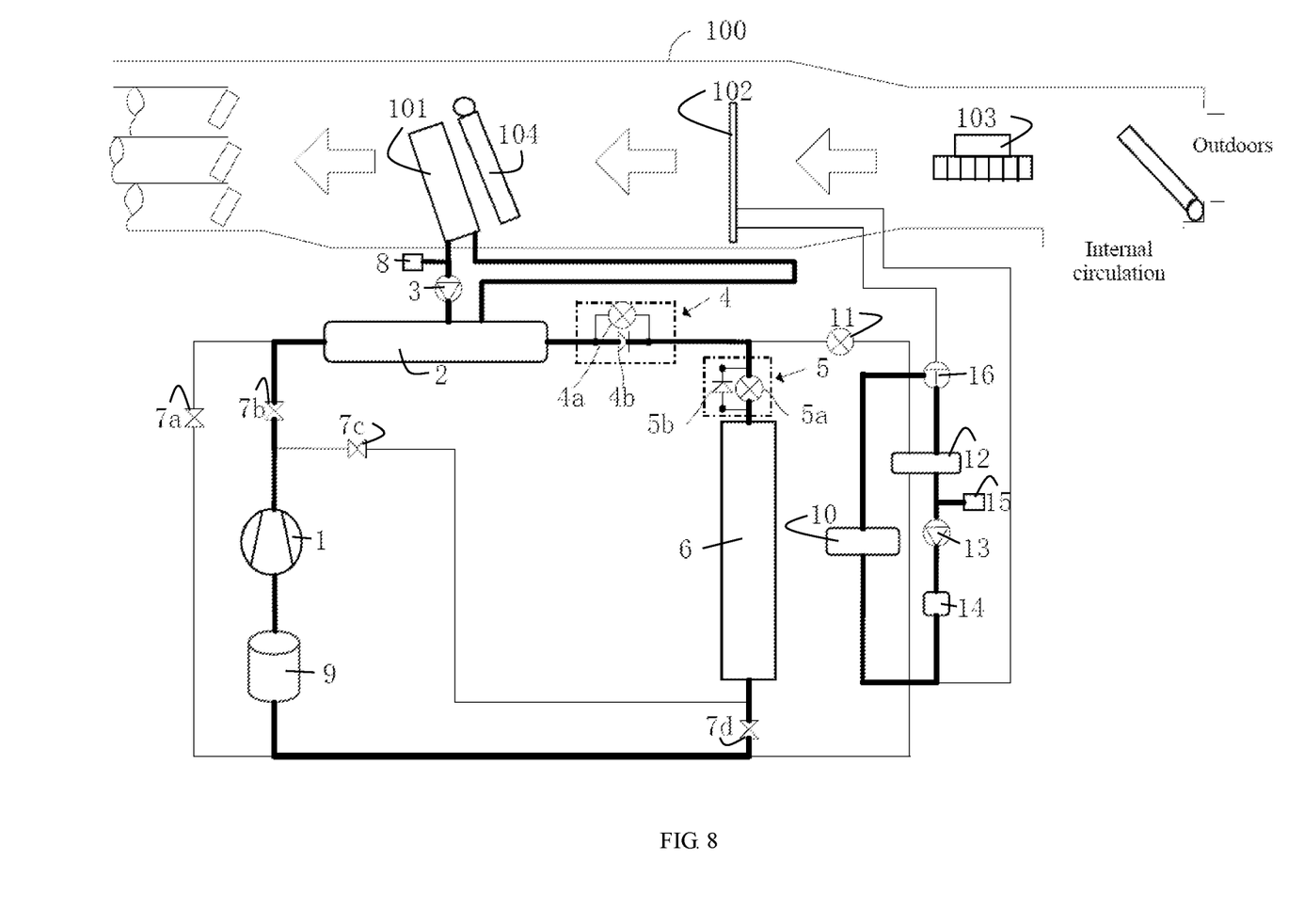
FIG. 8 is a schematic diagram of a refrigerant flow path and a circulating liquid flow path in a first heating mode and a circulating liquid flow path in the second heating mode of the automotive air conditioning system of FIG. 2, wherein the bold portion indicates the flow path.

Referring to FIG. 8, in the embodiment of the present application, the first heating mode and the second heating mode can be performed at the same time, so that both the compartment heating and the battery unit 10 heating can be achieved in the same time period, where the automobile is in a very cold environment.

In the prior art, the compartment cooling and the battery unit 10 cooling share the same heat exchanger, and the compartment heating and the battery unit 10 heating also need to share the same heat exchanger. As a result, both heat exchangers require greater power. The volume of the heat exchanger is large, and the amount of refrigerant charge is also large. In this embodiment, the second heat exchanger 2 is provided to realize cooling or heating of the compartment, and the circulating liquid circuit provided with the third heat exchanger 12 and the heater 14 is used to reduce or increase the temperature of the battery unit 10, which can reduce the problem of bulky components caused by using the same heat exchanger. Besides, the use of the circulating fluid circuit can reduce the amount of refrigerant charge.

Referring again to FIG. 2, the automotive air conditioning system may further include a fourth heat exchanger 102. In this embodiment, the fourth heat exchanger 102 is selected as a radiator, which can realize dehumidification of the compartment.

The automotive air conditioning system further includes a dehumidification mode, and the dehumidification mode is generally only used for dehumidification in winter. In the dehumidification mode, the compressor 1, the second heat exchanger 2, the expansion valve 11 and the third heat exchanger 12 are sequentially communicated to form a circuit. The third heat exchanger 12, the second pump 13 and the fourth heat exchanger 102 are sequentially communicated to form a circuit. Among them, the circuit formed and communicated in sequence by the compressor 1, the second heat exchanger 2, the expansion valve 11 and the third heat exchanger 12 is a refrigerant circuit, and the circuit formed and communicated in sequence by the third heat exchanger 12, the second pump 13 and the fourth heat exchanger 102 is a circulating fluid circuit.

Figure 9:
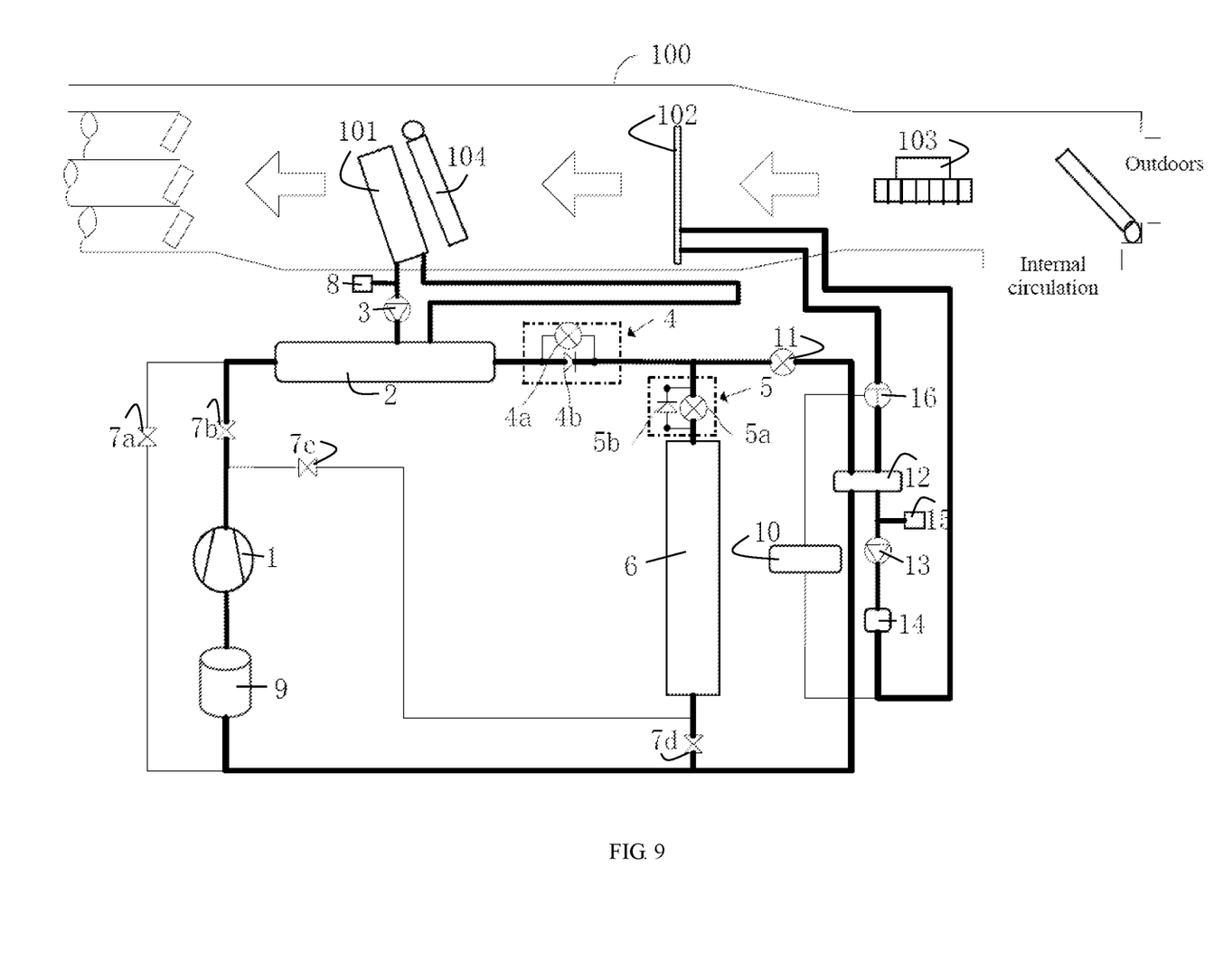
FIG. 9 is a schematic diagram of a refrigerant flow path and a circulating liquid flow path in a first heating mode and a dehumidification mode of the automotive air conditioning system of FIG. 2, wherein the bold portion indicates the flow path.

Referring to FIG. 9, in the dehumidification mode, the flow path of the refrigerant circuit includes: the compressor 1→the second shut-off valve 7b→the second heat exchanger 2→the first check valve 4b→the expansion valve 11→the third heat exchanger 12→the gas-liquid separator 9→the compressor 1. The flow path of the circulating liquid circuit includes: the second pump 13→the heater 14→the fourth heat exchanger 102→the third heat exchanger 12→the second pump 13. Specifically, in the dehumidification mode, the heater 14 only functions as flowing the circulating fluid.

Referring to FIG. 9, in the dehumidification mode, the compressor 1 compresses a low-temperature and low-pressure gaseous refrigerant into a high-temperature and high-pressure gaseous refrigerant. The high-temperature and high-pressure gaseous refrigerant enters the second heat exchanger 2 and exchanges heat with the circulating liquid in the heat exchanger 2. Specifically, the refrigerant releases heat to heat the circulating liquid in the second heat exchanger 2 to a high-temperature circulating liquid. The high-temperature circulating fluid enters the first heat exchanger 101 and exchanges heat with the air flow around the first heat exchanger 101 (the air flow is the air cooled and dehumidified by the fourth heat exchanger 102). The cooled refrigerant flows to the expansion valve 11 and is reduced in temperature and pressure to a low-temperature and low-pressure refrigerant. The low-temperature and low-pressure refrigerant enters the third heat exchanger 12 and exchanges heat with the circulating liquid in the third heat exchanger 12 to absorb the heat of the circulating fluid. The low temperature circulating fluid enters the fourth heat exchanger 102 and the air around the fourth heat exchanger 102 for heat exchange in order to absorb the heat in the air to reduce the temperature and humidity of the air around the fourth heat exchanger 102. The dehumidified air flows to the first heat exchanger 101, and after being heat-exchanged in the first heat exchanger 101, it enters the compartment to realize a dehumidification function and provide a comfortable environment. The refrigerant undergoes a phase change and most of the refrigerant evaporates into a low-temperature and low-pressure gaseous refrigerant, which flows back into the compressor 1 to realize the recycling of the refrigerant.

Referring to FIG. 2, the automotive air conditioning system may further include a three-way valve 16. A first outlet of the three-way valve 16 is communicated with the battery unit 10, a second outlet of the three-way valve 16 is communicated with the third heat exchanger 12, and a third outlet of the three-way valve 16 is communicated with the fourth heat exchanger 102. By controlling the three-way valve 16, the branches are opened and closed, thereby realizing switching of different modes. Of course, it is also possible to use two shut-off valves instead of the three-way valve 16 to control the opening and closing of the corresponding branches and realize the switching of different modes.

Referring again to FIG. 2, the automotive air conditioning system may further include a case (i.e., an air conditioning case). The first heat exchanger 101 and the fourth heat exchanger 102 are disposed in the air conditioning case 100. In the prior art, the heat exchanger of the first cooling mode and the heat exchanger of the dehumidification mode provided in the air conditioning case share the same heat exchanger, and the heat exchanger of the first heating mode needs to be separately provided. The power required by the first cooling mode and the first heating mode is large, so the volume of the two heat exchangers is large. In this embodiment, the heat exchanger of the first cooling mode and the heat exchanger of the first heating mode provided in the air conditioning case share the same heat exchanger (that is the first heat exchanger 101), and the heat exchanger of the dehumidification mode (that is the fourth heat exchanger 102) is independently provided. Since the first cooling mode and the first heating mode cannot work at the same time, the volume required for the second heat exchanger 2 is the volume of the heat exchanger corresponding to the maximum power of the current heat exchanger of the first cooling mode and the heat exchanger of the first heating mode. Because the power required by the dehumidification mode is small, the load of the fourth heat exchanger 102 is reduced, so the volume of the fourth heat exchanger 102 is reduced. Therefore, the volume of the air conditioning case is reduced, and the control of the air conditioning system is made simpler.

Referring again to FIG. 1, the automotive air conditioning system may further include a baffle plate 104, which is disposed between the first heat exchanger 101 and the fourth heat exchanger 102, to control the amount of air blown to the first heat exchanger 101, therefore controlling the amount of cold air or hot air blown to the compartment.

Referring again to FIG. 8, in the embodiment of the present application, the first heating mode and the dehumidification mode work simultaneously. A fan 103 is also provided on the side of the fourth heat exchanger 102 away from the baffle plate 104, so as to speed up the air flow and improve the working efficiency of the air conditioning system. In this embodiment, the fan 103 is opposite to the fourth heat exchanger 102. By controlling the opening and closing of the fan 103, the amount of air blown to the first heat exchanger 101 and the fourth heat exchanger 102 can be controlled. In the case of high air humidity, if only dehumidification is needed, the position of the baffle plate 104 can be controlled so that the baffle plate 104 can completely block the first heat exchanger 101 and the fan 103, so that the air from the fan 103 cannot be directly blown to the first heat exchanger 101. The fan 103 may be selected as a blower 103 or other.

In addition, an air door in the air conditioning case can be provided or not, and it has no effect to the air conditioning system. The simplification of the internal structure of the air conditioning case greatly reduces the resistance of the air duct, which can save the power consumption of the fan 103 and increase the cruising range.

It should be noted that in the above embodiments, a plurality of shut-off valves are specifically described. By controlling opening and closing of the shut-off valves, it is realized to open and close the branches, thereby switching multiple modes. The shut-off valves have simple structures and reliable control of opening and closing thereof. It can be understood that those skilled in the art can also realize the formation of the circuits in each mode in other ways, which is not limited to the above embodiments of the shut-off valve, such as using the three-way valve 16 to replace two shut-off valves etc.

It should also be noted that, in the embodiment of the present application, the second heat exchanger 2, the first heat exchanger 101, the outdoor heat exchanger 6, the third heat exchanger 12 and the fourth heat exchanger 102 are arranged in such a manner that in any mode, the inlet and outlet of each heat exchanger will not act as both an inlet and an outlet, so that the ability of the heat exchanger can be brought into play.

The above are only preferred embodiments of the present application and are not intended to limit the present application. Any modification, equivalent replacement, or improvement made within the spirit and principle of the present application should be included within the scope of protection of the present application.

What is claimed is:

1. An automotive air conditioning system, comprising a compressor, a first heat exchanger, a first combined valve, a second combined valve and an outdoor heat exchanger;

the automotive air conditioning system further comprising a first cooling mode and a first heating mode; the compressor, the outdoor heat exchanger, the second combination valve, the first combined valve and the first heat exchanger being communicated in sequence to form a circuit in the first cooling mode;

the compressor, the first heat exchanger, the first combined valve, the second combined valve and the outdoor heat exchanger being communicated in sequence to form a circuit in the first heating mode;

the automotive air conditioning system further comprising a circulating liquid circuit with a fourth heat exchanger therein;

the automotive air conditioning system further comprising an air conditioning case in which the first heat exchanger and the fourth heat exchanger are disposed, the fourth heat exchanger being disposed upstream of the first heat exchanger; wherein the automotive air conditioning system further comprises a battery unit, a third expansion device, a third heat exchanger and a second pump, the third heat exchanger being a liquid heat exchanger; wherein the automotive air conditioning system further comprises a second cooling mode in which the compressor, the outdoor heat exchanger, the third expansion device and the third heat exchanger are communicated in sequence to form a circuit, and the third heat exchanger, the second pump and the battery unit are communicated in sequence to form a circuit.

2. The automotive air conditioning system according to claim 1, further comprising a second heat exchanger and a first pump, in the first cooling mode, the compressor, the outdoor heat exchanger, the first combined valve and the second heat exchanger being communicated in sequence to form a circuit, and the first pump, the second heat exchanger and the first heat exchanger being communicated in sequence to form a circuit;

in the first heating mode, the compressor, the second heat exchanger, the second combination valve and the outdoor heat exchanger being communicated in sequence to form a circuit, and the first pump, the second heat exchanger and a first heat exchanger being communicated in sequence to form a circuit.

3. The automotive air conditioning system according to claim 2, wherein:

the first combination valve comprises a first expansion valve and a first check valve connected in parallel;

the second combined valve comprises a second expansion valve and a second check valve connected in parallel;

in the first heating mode, refrigerant flows in order through the second heat exchanger, the first check valve, the second expansion valve and the outdoor heat exchanger; in the first cooling mode, the refrigerant flows in order through the outdoor heat exchanger, the second check valve, the first expansion valve and the second heat exchanger.

4. The automotive air conditioning system according to claim 2, wherein the automotive air conditioning system further comprises a dehumidification mode in which the compressor, the second heat exchanger, the third expansion device and the third heat exchanger are communicated in sequence to form a circuit, and the third heat exchanger, the second pump and the fourth heat exchanger are communicated in sequence to form a circuit.

5. The automotive air conditioning system according to claim 1, further comprising a three-way valve, a first outlet of the three-way valve being communicated with the battery unit, a second outlet of the three-way valve being communicated with the third heat exchanger, and a third outlet of the three-way valve being communicated with the fourth heat exchanger.

6. An automotive air conditioning system comprising:
a compressor;
a first heat exchanger;
a third heat exchanger;
a second expansion device;
a third expansion device;
an outdoor heat exchanger;
a battery unit;
a second pump;

the automotive air conditioning system includes a cabin heating and battery unit cooling mode in which the compressor, the first heat exchanger, the second expansion device and the outdoor heat exchanger are communicated in sequence to form a refrigerant circuit; the compressor, the first heat exchanger, the third expansion device and the third heat exchanger are communicated in sequence to form another refrigerant circuit; and the second pump, the battery unit and the third heat exchanger are communicated to form a circulating fluid circuit;

a refrigerant flowing through the refrigerant circuit and the another refrigerant circuit, and a circulating liquid flowing through the circulating liquid circuit, the circulating liquid being adapted to absorb the heat of the battery unit, the refrigerant being adapted to absorb the heat of the circulating liquid via the third heat exchanger.

7. The automotive air conditioning system according to claim 6, further comprising a first expansion device; the automotive air conditioning system including a cooling mode in which the compressor, the outdoor heat exchanger, the first expansion device and the first heat exchanger are communicated in sequence to form a circuit.

8. The automotive air conditioning system according to claim 7, wherein in the cooling mode, the compressor, the outdoor heat exchanger, the third expansion device and the third heat exchanger are communicated in sequence to form a circuit; the cooling mode includes a first cooling mode and a second cooling mode, wherein:

at the same time, the automotive air conditioning system is capable of executing the first cooling mode and the second cooling mode simultaneously; wherein when the first cooling mode and the second cooling mode are executed simultaneously, after the refrigerant flowing out of the outdoor heat exchanger, the refrigerant is divided into two paths, one of which enters the first expansion device to perform throttling to achieve the first cooling mode, and the other of which enters the third expansion device to perform throttling to achieve the second cooling mode.

9. The automotive air conditioning system according to claim 7, wherein the first expansion device and the second expansion device are communicated in series between the first heat exchanger and the outdoor heat exchanger, wherein the first expansion device is communicated with the first heat exchanger, and the second expansion device is communicated with the outdoor heat exchanger; wherein the second expansion device and the third expansion device are communicated in series between the third heat exchanger and the outdoor heat exchanger, wherein the third expansion device is communicated with the third heat exchanger, and the second expansion device is communicated with the outdoor heat exchanger; wherein the first expansion device comprises a first expansion valve and a first check valve connected in parallel; and the second expansion device comprises a second expansion valve and a second check valve connected in parallel.

10. The automotive air conditioning system according to claim 6, further comprising an air conditioning case and a fourth heat exchanger; the automotive air conditioning system including a dehumidification mode in which the compressor, the first heat exchanger, the third expansion device and the third heat exchanger are communicated in sequence to form a circuit; the second pump, the third heat exchanger and the fourth heat exchanger are communicated to form a circuit; the first heat exchanger and the fourth heat exchanger being located in the air conditioning case, and the fourth heat exchanger being located upstream of the first heat exchanger.

11. The automotive air conditioning system according to claim 10, further comprising a three-way valve of which a first outlet leads to the battery unit, a second outlet leads to the third heat exchanger, and a third outlet leads to the fourth heat exchanger.

12. The automotive air conditioning system according to claim 6, further comprising a heater, the automotive air conditioning system including a battery heating mode in which the second pump, the heater, the battery unit and the third heat exchanger are communicated to form a circuit.

13. An automotive air conditioning system comprising:
a compressor;
a first heat exchanger which is a liquid heat exchanger;
a second heat exchanger;
a third heat exchanger which is a liquid heat exchanger;
a first expansion device;
a second expansion device;
a third expansion device;
an outdoor heat exchanger;
a first pump;
a second pump;
a battery unit;
the automotive air conditioning system including a first cooling mode, a second cooling mode and a first heating mode, wherein:
in the first cooling mode, the compressor, the outdoor heat exchanger, the first expansion device and the second heat exchanger are communicated in sequence to form a circuit; and the first pump, the first heat exchanger and the second heat exchanger are communicated to form a circuit;
in the second cooling mode, the compressor, the outdoor heat exchanger, the third expansion device and the third heat exchanger are communicated in sequence to form a circuit; and the second pump, the third heat exchanger and the battery unit are communicated to form a circuit; and
in the first heating mode, the compressor, the second heat exchanger, the second expansion device and the outdoor heat exchanger are communicated in sequence to form a circuit; and the first pump, the first heat exchanger and the second heat exchanger are communicated to form a circuit.

14. The automotive air conditioning system according to claim 13, wherein the automotive air conditioning system is capable of executing the first cooling mode and the second cooling mode simultaneously.

15. The automotive air conditioning system according to claim 13, further comprising an air conditioning case and a fourth heat exchanger; the automotive air conditioning system including a dehumidification mode in which the compressor, the second heat exchanger, the third expansion device and the third heat exchanger are communicated in sequence to form a circuit; the second pump, the third heat exchanger and the fourth heat exchanger are communicated to form a circuit; the first heat exchanger and the fourth heat exchanger being located in the air conditioning case, and the fourth heat exchanger being located upstream of the first heat exchanger.

16. The automotive air conditioning system according to claim 15, further comprising a three-way valve of which a first outlet leads to the battery unit, a second outlet leads to the third heat exchanger, and a third outlet leads to the fourth heat exchanger.

17. The automotive air conditioning system according to claim 15, further comprising a baffle plate disposed between the first heat exchanger and the fourth heat exchanger.

18. The automotive air conditioning system according to claim 13, further comprising a heater, the automotive air conditioning system including a battery heating mode in which the second pump, the heater, the battery unit and the third heat exchanger are communicated to form a circuit.

19. The automotive air conditioning system according to claim 13, wherein the first expansion device and the second expansion device are communicated in series between the second heat exchanger and the outdoor heat exchanger, wherein the first expansion device is communicated with the second heat exchanger, and the second expansion device is communicated with the outdoor heat exchanger; wherein
the second expansion device and the third expansion device are communicated in series between the third heat exchanger and the outdoor heat exchanger, wherein the third expansion device is communicated with the third heat exchanger, and the second expansion device is communicated with the outdoor heat exchanger; wherein
the first expansion device comprises a first expansion valve and a first check valve connected in parallel; and
the second expansion device comprises a second expansion valve and a second check valve connected in parallel.

20. The automotive air conditioning system according to claim 13, further comprising a first expansion reservoir communicated with the first pump and a second expansion reservoir communicated with the second pump.

* * * * *